(12) United States Patent
Dharmadhikari et al.

(10) Patent No.: US 9,762,432 B2
(45) Date of Patent: Sep. 12, 2017

(54) SYSTEMS AND METHODS FOR RAPID FAILURE DETECTION IN FIBRE CHANNEL OVER ETHERNET NETWORKS

(71) Applicant: Dell Products, L.P., Round Rock, TX (US)

(72) Inventors: Vivek Dharmadhikari, San Jose, CA (US); Vinay Sawal, Fremont, CA (US); Sachinrao Panemangalore, San Jose, CA (US); Anil Chintalapati, San Jose, CA (US); Hariharan Krishnaswamy, San Jose, CA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 262 days.

(21) Appl. No.: 14/067,874

(22) Filed: Oct. 30, 2013

(65) Prior Publication Data

US 2015/0117175 A1     Apr. 30, 2015

(51) Int. Cl.
*G01R 31/08*     (2006.01)
*H04L 12/24*     (2006.01)
*H04L 12/703*    (2013.01)

(52) U.S. Cl.
CPC .......... *H04L 41/0659* (2013.01); *H04L 45/28* (2013.01)

(58) Field of Classification Search
CPC ........................................ H04L 45/28

USPC ......................................................... 370/216
See application file for complete search history.

(56) References Cited

U.S. PATENT DOCUMENTS

| | | | |
|---|---|---|---|
| 8,514,856 B1 * | 8/2013 | Gai et al. ...................... | 370/389 |
| 9,059,901 B1 * | 6/2015 | Kumar C S ............ | H04L 45/02 |
| 2008/0037581 A1 * | 2/2008 | Asano .......................... | 370/466 |
| 2008/0159311 A1 * | 7/2008 | Martinotti ............... | H04L 45/58 370/401 |
| 2008/0305743 A1 * | 12/2008 | Aithal ................. | H04L 43/0811 455/67.11 |
| 2012/0039163 A1 * | 2/2012 | Nakajima ........... | H04L 41/0654 370/217 |

* cited by examiner

*Primary Examiner* — Samina Choudhry
(74) *Attorney, Agent, or Firm* — Haynes & Boone, LLP (57) ABSTRACT

An information handling system is provided herein. The information handling system includes a central processor in communication with a network processor, a plurality of ports coupled to the network processor for sending and receiving Fiber Channel over Ethernet (FCoE) frames, and an Ethernet controller in communication with a physical connector and with the central processor. The information handling system further includes a management controller configured to communicate with a management system through the Ethernet controller to report a failure to be mitigated by temporarily stopping inputs and outputs on a coupled network device. Associated methods and computer-readable media having associated instructions are also provided herein.

20 Claims, 7 Drawing Sheets

SYSTEMS AND METHODS FOR RAPID FAILURE DETECTION IN FIBRE CHANNEL OVER ETHERNET NETWORKS

BACKGROUND

1. Technical Field

The present disclosure is related to information handling systems. In particular, embodiments disclosed herein are related to implementation and management of systems implementing the Fibre Channel over Ethernet (FCoE) protocol.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of currently available information handling system is a Fibre Channel over Ethernet (FCoE) network. FCoE is a protocol intended to permit lossless Fibre Channel communications, such as may exist in a Fibre Channel-based storage area network, to be transported over a lossy network, such as an Ethernet network. In an FCoE network, a Fibre Channel forwarder may take anywhere from a typical 20 seconds to a default 225 seconds to detect a node or interconnect failure. During the delay, traffic may be black-holed. Thus, such information handling systems have not been entirely satisfactory.

SUMMARY

Consistent with some embodiments, there is provided an information handling system. The information handling system includes a central processor in communication with a network processor, a plurality of ports coupled to the network processor for sending and receiving Fibre Channel over Ethernet (FCoE) frames, and an Ethernet controller in communication with a physical connector and with the central processor. The information handling system further includes a management controller configured to communicate with a management system through the Ethernet controller to report a failure to be mitigated by temporarily stopping inputs and outputs on a coupled network device.

Consistent with additional embodiments, there is provided a method of failure mitigation in a Fibre Channel over Ethernet (FCoE) network. The method includes a step of detecting a network failure with a management controller, in which the network failure occurs within or adjacent to an FCoE network device having the management controller. The method further includes steps of reporting the network failure to a management system in communication with the FCoE network device and with other FCoE network devices and of directing at least some of the other FCoE network devices to stop an input/output process.

Consistent with other embodiments, there is provided a computer-readable medium that contains instructions that when executed by one or more processors of an information handling system, causes the information handling system to perform a method of mitigating a failure in a Fibre Channel over Ethernet (FCoE) network. The instructions on the computer-readable medium include a method having steps of detecting a network failure with a management controller, the network failure occurring within or adjacent to an FCoE network device having the management controller, and of reporting the network failure to a management system in communication with the FCoE network device and with other FCoE network devices. The method further includes steps of receiving a failure notification from the management system at at least one of the other FCoE network devices and of stopping an input/output process at the at least one of the other FCoE network devices.

These and other embodiments will be described in further detail below with respect to the following figures.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Additionally, some embodiments of information handling systems include non-transient, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, any other physical medium with patterns of holes or depressions, RAM, PROM, EPROM, FLASH-EPROM, any other memory chip or cartridge, and/or any other medium from which a processor or computer is adapted to read.

Figure 1:
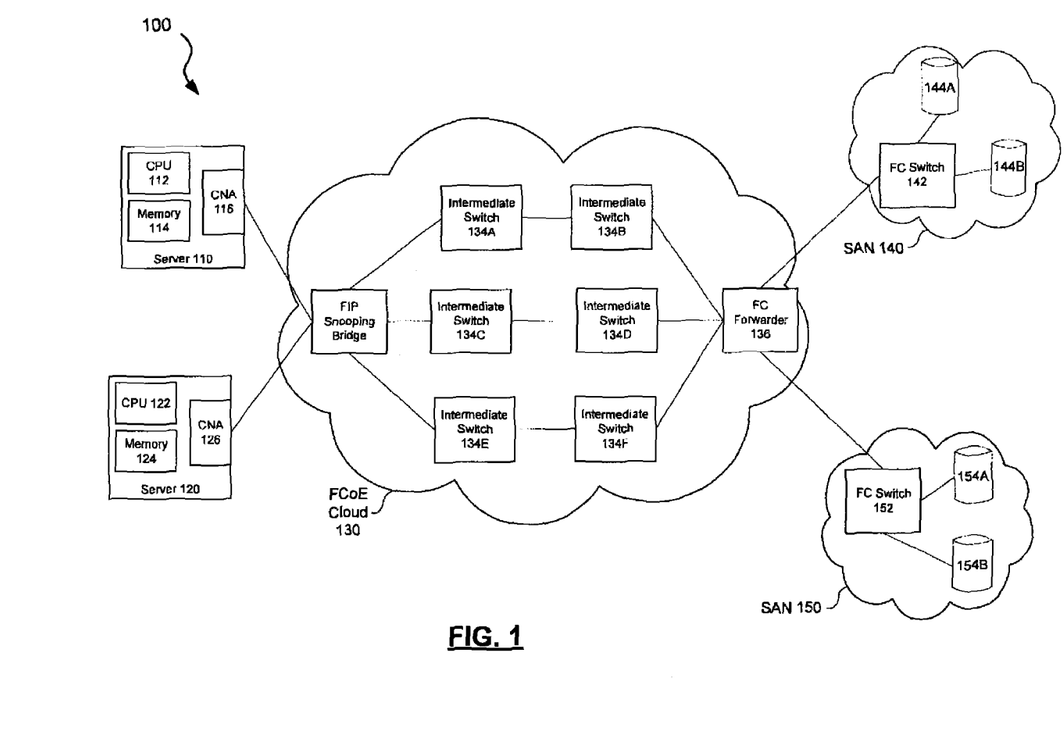
FIG. 1 is a diagram of an exemplary information handling system supporting the FCoE protocol according to an embodiment.

FIG. 1 depicts an information handling system 100. As illustrated, the information handling system 100 is a network that supports the Fibre Channel over Ethernet (FCoE) protocol, or is an FCoE network. Information handling system 100 includes two servers, an FCoE cloud, and two Fibre Channel based storage area networks. Other embodiments may include more or fewer servers or storage area networks. As illustrated, two servers 110 and 120 are included in information handling system 100. Server 110 includes at least one or more processors, labeled as CPU 112, a memory 114 in communication with the CPU 112, and a converged network adapter (CNA) 116. The CNA 116 combines the functions of a host bus adapter and a network interface controller to allow the server 110 to communicate with a Fibre Channel-based storage area network and an Ethernet-based network. The memory may include one or more types of computer memory, such as a hard disk drive, a solid-state drive, RAM, and/or ROM. Server 120 similarly includes a CPU 122, a memory 124, and a CNA 126.

The CNAs 116 and 126 enable the servers 110 and 120 to communicate with FCoE switches in an FCoE cloud 130 to receive FCoE packets. As depicted in FIG. 1, the servers 110 and 120 are coupled to a bridge device. As illustrated, the bridge device is an FCoE Initialization Protocol (FIP) supporting switch, referred to as a FIP snooping bridge or an FSB switch 132. The FSB switch 132 supports FCoE layer 2 forwarding and the Data Center Bridging Capability Exchange Protocol (DCBX) and also provides security features. While only one FSB switch 132 is illustrated in FIG. 1, embodiments of the information handling system 100 may include more than one such network device.

As illustrated, the FCoE cloud 130 includes a number of intermediate switches, labeled as intermediate switches 134A, 134B, 134C, 134D, 134E, and 134F, coupling the FSB switch 132 to a Fibre Channel (FC) forwarder 136. The FC forwarder 136 receives FC frames from a storage area network and encapsulates them in an FCoE frame for transport by layer 2 devices in the FCoE cloud 130. Similarly, the FC forwarder 136 is configured to receive FCoE frames from the intermediate switches and decapsulated them to provide FC frames to a storage area network.

The information handling system 100 of FIG. 1 includes two storage area networks: a storage area network 140 and a storage area network 150. The storage area networks 140 and 150 are depicted in a simplified format that includes a Fibre Channel switch coupled to a plurality of storage devices such as hard drives. Thus, the storage area network 140 includes an FC switch 142 and storage drives 144A and 144B, and if the storage area network 150 includes an FC switch 152 and storage drives 154A and 154B. Some embodiments of the information handling system 100 may include one or more additional FC forwarders like the FC forwarder 136. For example, the information handling system 100 may include a first FC forwarder coupled to the storage area network 140 and a second FC forwarder coupled to the storage area network 150.

The information handling system 100 provides for lossless transport of Fibre Channel frames over a layer two network to a plurality of connected servers. While Fibre Channel networks are "point-to-point" networks, and thus faults may be easily detected through identifying a link failure, Ethernet networks like the FCoE cloud 130 may use a keepalive mechanism to monitor for failures. The FCoE Initialization Protocol (FIP) is a control plane protocol that mandates the sending of periodic FIP keepalive advertisements. If a Fibre Channel forwarder does not receive a keepalive advertisement before the FIP keepalive timer expires, the Fibre Channel forwarder considers the virtual inter switch link (ISL), also referred to herein as an interconnect or link, as being down and stops the transmission of FCoE frames. Relying on this keepalive mechanism may prevent the loss of some data. However, a delay of around 20 seconds or more in detecting ENode or interconnect failures may be common. During the delay traffic may be black-holed. While such failures may be tolerated in some deployments, for critical deployments such traffic outages are unacceptable. To provide a shorter delay, such as a sub-second delay, each of the network devices in the information handling system 100 includes a management controller (MC) in addition to other hardware. The operation and use of the management controllers may be better understood by reference to FIG. 2.

Figure 2:
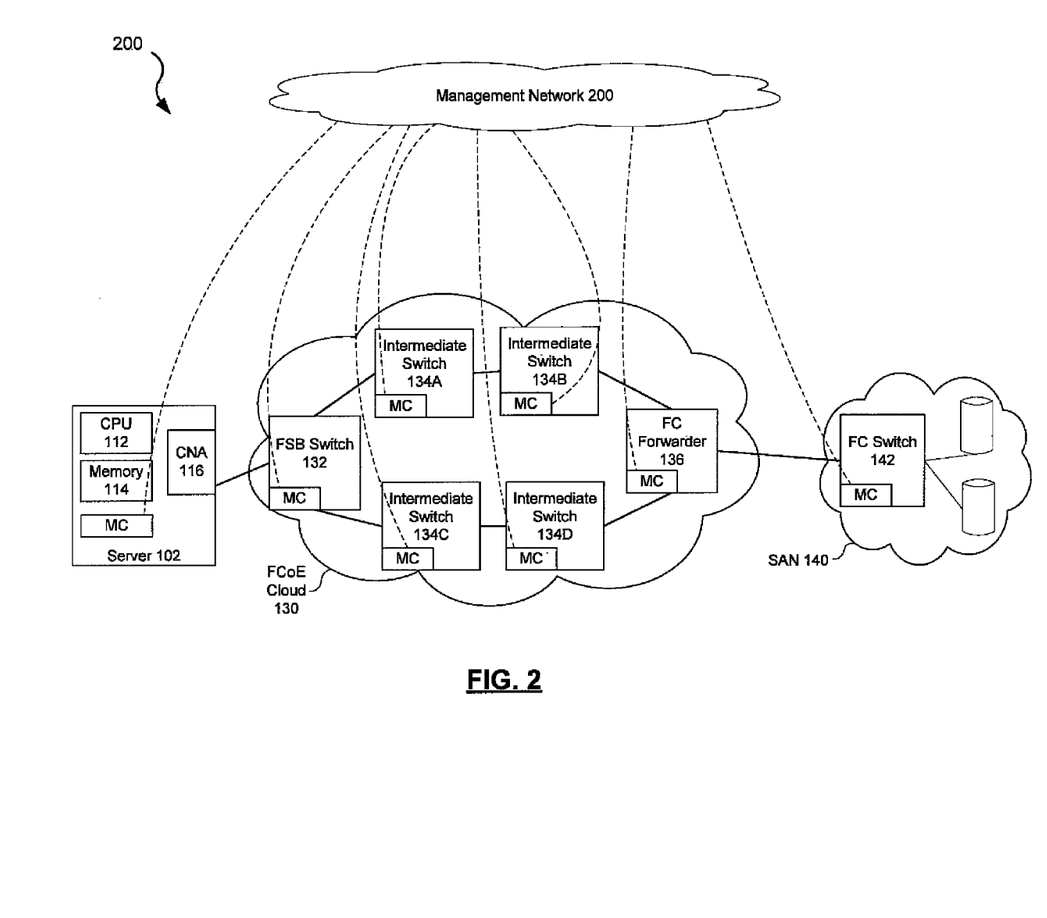
FIG. 2 is a diagram of an information handling system with an illustrated management network according to an embodiment.

Referring now to FIG. 2, the information handling system 100 of FIG. 1 is shown as including a management network 200 that is present but not depicted in FIG. 1. The management network 200 is an out-of-band network, overlaying the devices illustrated in FIG. 1, that facilitates communication between the management controllers on the individual network devices. In the illustrated embodiment, the management network 200 is a system that provides an administration interface out-of-band management of the information handling system 100. In some embodiments, the management network 200 provides an Intelligent Platform Management Interface (IMPI) system. Thus, the server 102 includes a host CPU or host processor (or processors) in communication with a network processor, such as is in the CNA 116, and also in communication with a management controller, or baseboard management controller. In some embodiments of the information handling system 100, not all devices include a management controller. For example, some of the intermediate switches 134A-D may not have a management controller.

The management controller is a hardware component that can be used to control and monitor hardware resources and conditions of a network device. For example, the management controller may interface with sensors to monitor voltages, temperatures, fan speeds, etc., to monitor operating conditions of the network device. Each management controller is able to log system events and store information for use at a later time. Traffic may be received by a network device such as the Fibre Channel forwarder 136 and directed to the CPU or the management controller as needed over a shared port.

As illustrated in FIG. 2, the management network 200 serves to couple the management controllers present on each of the devices in the information handling system 100. Thus, the management network 200 allows for the collection, exchange, and consolidation of information provided by each of the management controllers. By using the management controllers in communication through the management network 200, identification of and response to node or interconnect failures may be provided apart from reliance on the FIP keepalive mechanism.

The management controllers on each of the devices in the information handling system 100 may periodically advertise information to each other. Information may also be exchanged on an even-driven basis. The information may include identification, capability, and protocol state information. For example, the management controller on the intermediate switch 134B may advertise its own media access control (MAC) address as well as the MAC address of the intermediate switch 134B itself. The management controller may also advertise, and thereby share, a list of supported external and/or internal protocols. Exemplary external protocols may include DCBX, link layer discovery protocol (LLDP), FCoE Initialization Protocol, FCoE, and others. Exemplary internal protocols may include Fabric Map, VLAN, Fabric Set, and others. This information may provide the other devices, or nodes, within the information handling system 100 an awareness of capabilities of the particular devices therein. Additionally, a node type identifier may be included in the advertisements to indicate whether the advertising network device is a server, an FC forwarder or NPIV switch, a fabric switch, a layer 2 switch, or a target device. The advertised information may further include the state identifier indicating whether the associated device is up or down, waiting, or experiencing an error. This information may be protocol specific state information relating to the protocols supported by the device.

By the exchange of information, such as that provided by the advertisement of the intermediate switch 134B, each management controller in the information handling system 100 may build a topology-aware database of information, meaning that the information may be organized to provide a topology of the information handling system 100 and specific information for each network device in the topology. This database can be queried for fault detection and other actions and can be updated by regular update advertisements or by event-driven messages such as an offline link or out-of-sync indication.

Figure 3:
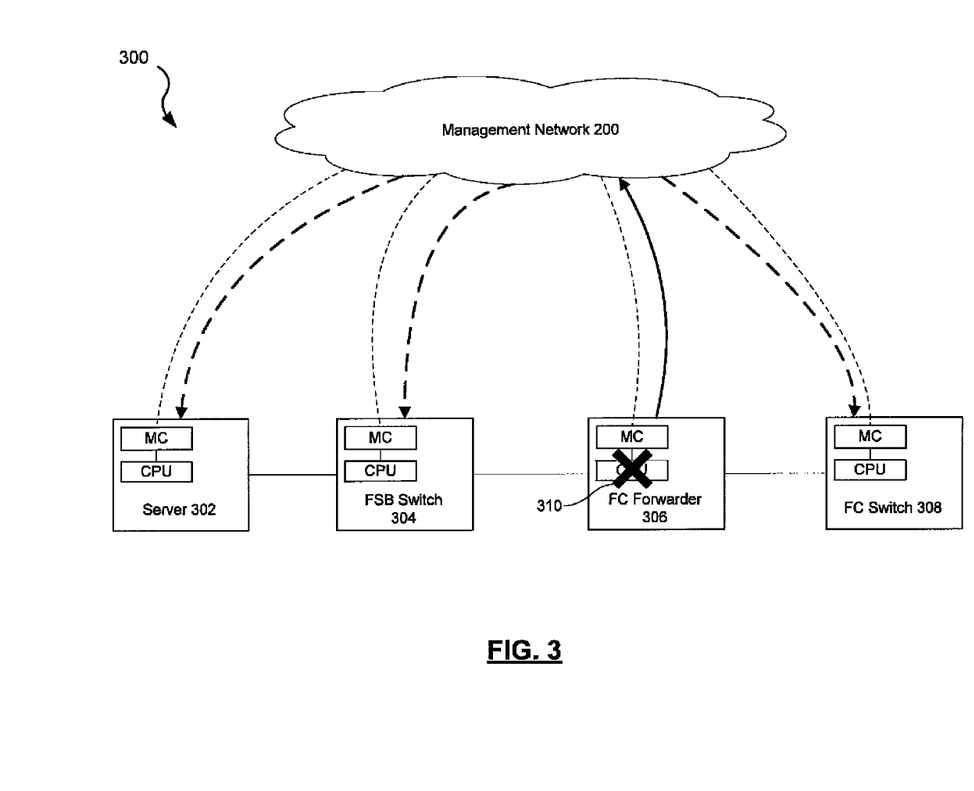
FIG. 3 is a diagram of an exemplary information handling system during a device processor failure according to an embodiment.
Figure 4:
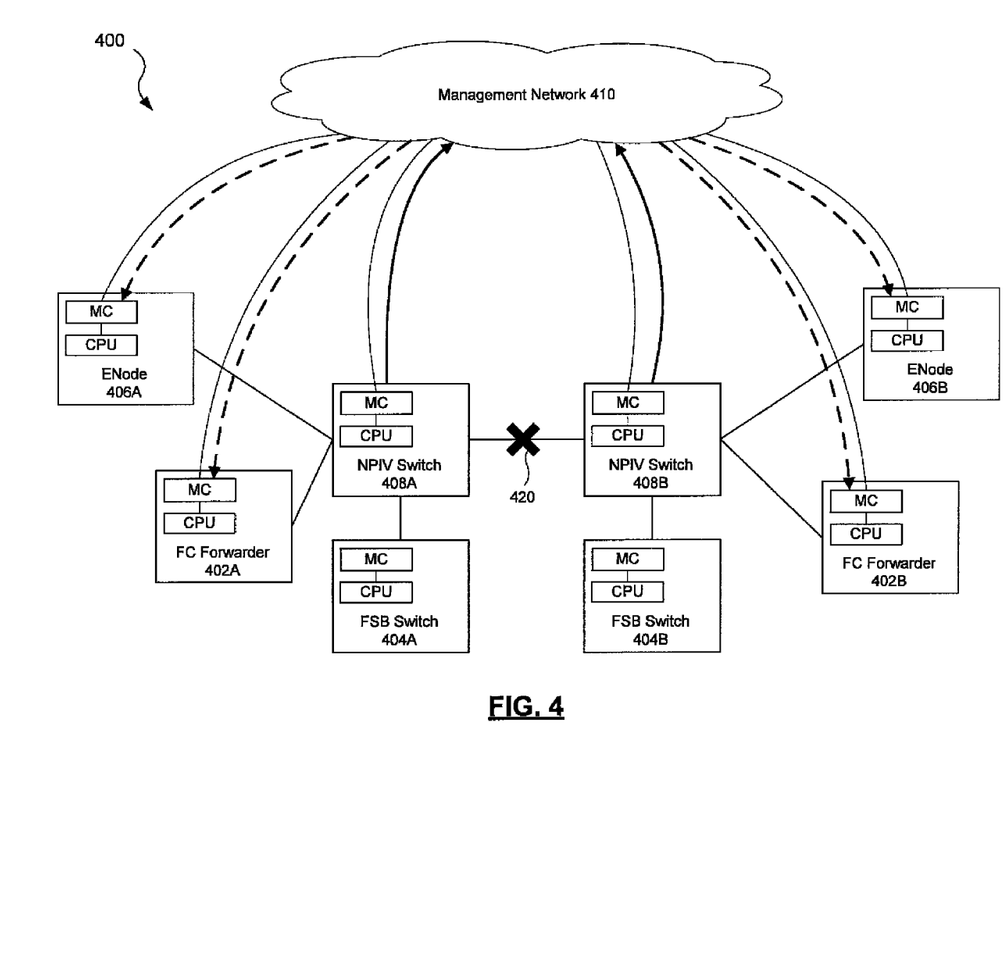
FIG. 4 is a diagram of an information handling system during a link failure according to an embodiment.

FIGS. 3 and 4 provide examples of the out-of-band management system's response to different types of network failures.

FIG. 3 is a diagram of a simplified information handling system 300 that is similar in many respects to the information handling system 100 shown in FIGS. 1 and 2. The information handling system 300 is simplified to more clearly explain the operation of the management system that includes the management network 200 and the management controllers operating on each of the devices in the information handling system 300. The information handling system 300 includes a server 302 coupled to an FSB switch 304, which in turn is coupled to an FC forwarder 306. For simplicity, the intermediate switches shown in FIGS. 1 and 2 have been omitted from the information handling system 300. The FC forwarder 306 is coupled to an FC switch 308 that is part of a storage area network. As explained above, each of the network devices of the information handling system 300 includes a management controller in addition to the host CPU, the network processing unit (NPU), and/or other processors.

A node failure 310 is also illustrated in FIG. 3. The node failure 310 may be caused by a hardware failure or software failure, such as a host operating system failure. When the failure occurs, the management controller is alerted to the failure. For example, the CPU and the management controller may be connected by the general purpose input/output (GPIO) pin, the value of which may toggle in response to the failure. The management controller on the FC forwarder 306 recognizes the toggling as indicating that the FC forwarder 306 has failed, that the node failure 310 has occurred.

As illustrated, the management controller of the FC forwarder 306 sends a message to the management network 200. The message identifies both the type of failure and the source of the failure. Thus, in response to the node failures 310 the management controller on the FC forwarder 306 sends a message including a MAC address and indicating that the failure is a node type failure. The transmission of this message is indicated by the solid-line arrow leading from the FC forwarder 306 to the management network 200. In response, the management network 200 alerts the other members of the network with a message that includes topological information locating the failure 310. This is indicated in FIG. 3 by the dashed-line arrows leading from the management network 200 to the server 302, the FSB switch 304, and the FC switch 308. The message is received by the management controllers on these respective devices so that the devices may respond appropriately to avoid the loss of data. For example, the management controller on the server 302 may communicate with the CPU thereof to stop any pending inputs or outputs to prevent the associated traffic from being lost in a "black hole". The topology-aware databases of each of the management controllers may be updated to reflect the information provided in the message or advertisement. Thus, each of the devices in the information handling system 300 is alerted to the failure and to the location of the failure. In some instances this may allow for the simple rerouting of traffic around the failure, in other instances traffic may be stopped to prevent the loss of frames.

FIG. 4 is a diagram of an information handling system 400. The information handling system 400 is similar to many respects to information handling systems 100 and 300, in that it includes a plurality of FCoE and FC supporting devices. The devices include two FC forwarders 402A and 402B and two FSB switches 404A and 404B. The information handling system 400 further includes two FCoE nodes or ENodes 406A and 406B, which are coupled to N_Port identifier virtualization (NPIV) switches 408A and 408B, respectively. Each device has a management controller coupled to a management network 410 that allows each management controller to communicate with each other management controller.

FIG. 4 also illustrates a link failure 420 on the link between the NPIV switches 408A and 408B. Each of these devices includes a component, such as a field programmable gate array (FPGA) or a complex programmable logic device (CPLD), to monitor the status of links to the device. The component is coupled to the management controller by of a bus, such as a PCI bus. The component sends an interrupt to the management controller in the event of a link failure. Alternatively or additionally, the host CPU may inform the management controller of the link failure. As an example, the NPIV switch 408B may receive the interrupt signaling the link failure 420 on the port associated with the link to NPIV 408A. The management controller creates a message that includes identifiers, such as the MAC address or address, of all end-node peers coupled to NPIV 408B, and with an indication that a node failure occurred associated with the end-node peers. The information in the message permits other devices to take appropriate actions in response to the failure.

The message may be transmitted through the management network 410 to all devices in the information handling system 400 having a management controller, or only to directly coupled, FCoE peer devices. Thus the NPIV switch 408B may send the message of the link failure 420 to the NPIV switch 408A, the ENode 406B, and the FC forwarder 402B. When the NPIV switch 408A receives the message, the management controller checks the topology-aware database to determine whether the failed link of link failure 420 is in its spanning tree protocol (STP) path. Because the link failure 420 is in its STP path, the NPIV switch 408A sends a message to its FCoE peers, in this example, ENode 406A and FC Forwarder 402A, to stop pending inputs and outputs.

Similarly, when NPIV switch 408A independently detects the link failure 420, it sends a message to its peers, including NPIV switch 408B. Because the failed link of the link failure 420 is in the STP path of NPIV switch 408B, switch 408B sends a message to ENode 406B and FC forwarder 402B to stop any pending inputs and outputs.

The FSB switch 404B also receives the interconnect failure message from the NPIV switch 408B, but because the failed link is not in its STP path to reach ENode 406B and/or FC forwarder 402B, the FSB switch 404B may not stop pending inputs/outputs. The FSB switch 404A may also receive notification of the link failure 420 from NPIV switch 402B. Because the link failure 420 is in its STP path, the FSB switch 404A may send messages to its FCoE peers to stop pending inputs and outputs. In this way, the information handling system 400 including the overlay management network 450 may provide for rapid failure detection and mitigation in response to the detection of a link failure.

Figure 5:
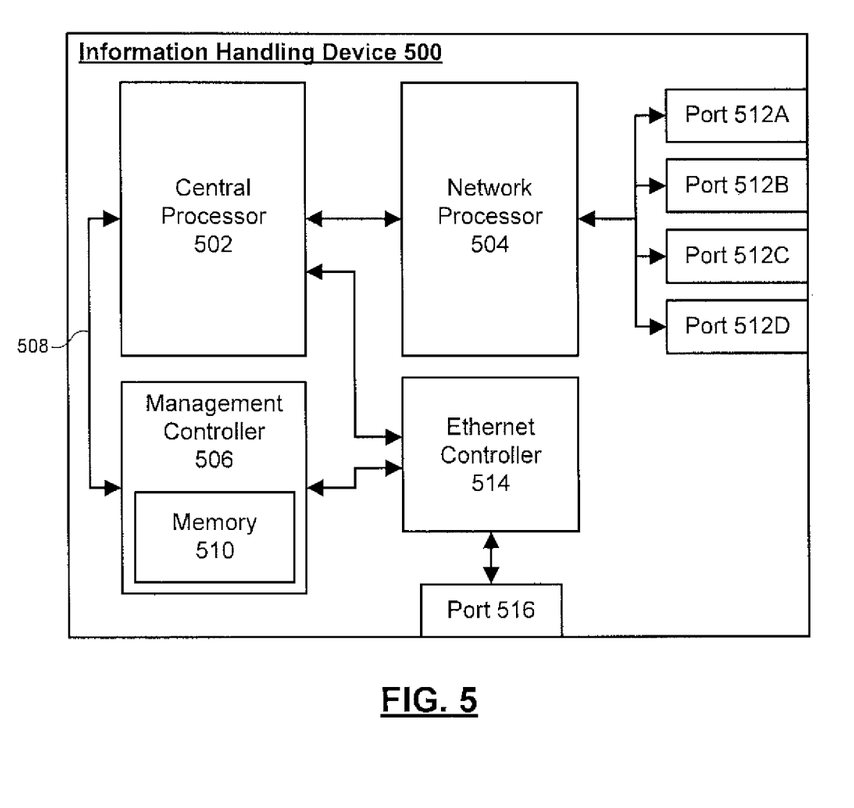
FIG. 5 is a diagram showing of an information handling device according to an embodiment.

FIG. 5 is a diagram of a network device 500 such as may be used for the devices in the information handling systems 100, 300, and/or 400. The network device 500 includes a plurality of processors and/or processing cores. As illustrated, the network device 500 includes a central processor 502, a network processor 504, and a management controller 506. The management controller 506 may be a Baseboard Management Controller (BMC) operating according to an out-of-band management architecture, such as the IPMI architecture. The management controller 506 is a system-on-a-chip (SoC) device having a processor, memory, and networking capabilities in a single device. The management controller 506 further includes a power supply that is separate from that of the central processor 502, allowing the management controller 506 to operate even when the central processor 502 is powered down. The central processor 502 and the management controller 506 are coupled together by an interface and a communication line or lines 508. Such interfaces may include a universal asynchronous receiver/transmitter (UART), a general-purpose input/output pin, a serial peripheral interface bus, a universal serial bus, a peripheral component interconnect, or another such interface technology with associated hardware.

As discussed, the management controller 506 may be an SoC device that includes a memory 510. Also as discussed above, the management controller 506 receives data from a host CPU like the central processor 502 and from other management controllers in an associated management network. The data received from the central processor 502 and/or the other management controllers may be consolidated and stored in a database. As discussed in connection with the information handling systems 100, 300, and/or 400, the memory 510 of the management controller 506 may store a topology of the management network in a database that includes information regarding the identity, capability, and protocol state from each of the management controllers. This topology-aware database may be used by the management controller 506 to determine appropriate responses to failures reported by the central processor 502 or by messages received from one or more of the other management controllers in the management network.

The network device 500 also depicts a plurality of ports in communication with a network processor 504. The ports 512A, 512B, 512C, and 512D allow the network device 500 to receive communications from other network devices. The network processor 504 and the ports 512A-D may provide a converged network adapter such as the CNA 116 seen in FIGS. 1 and 2. An Ethernet controller 514 is also included in the network device 500. The Ethernet controller 514 may facilitate communication to and from the central processor 502 and the management controller 506 through a port 516. The Ethernet controller 514 allows for the filtering of ingress traffic to either the central processor 502 or the management controller 506 as directed by the traffic. The shared port 516 may be an R.J. 45 type connector.

While not expressly depicted in FIG. 5, the management controller 506 may be coupled to a plurality of sensors including temperature sensors, voltage sensors, fan speed sensors, etc.

Figure 6:
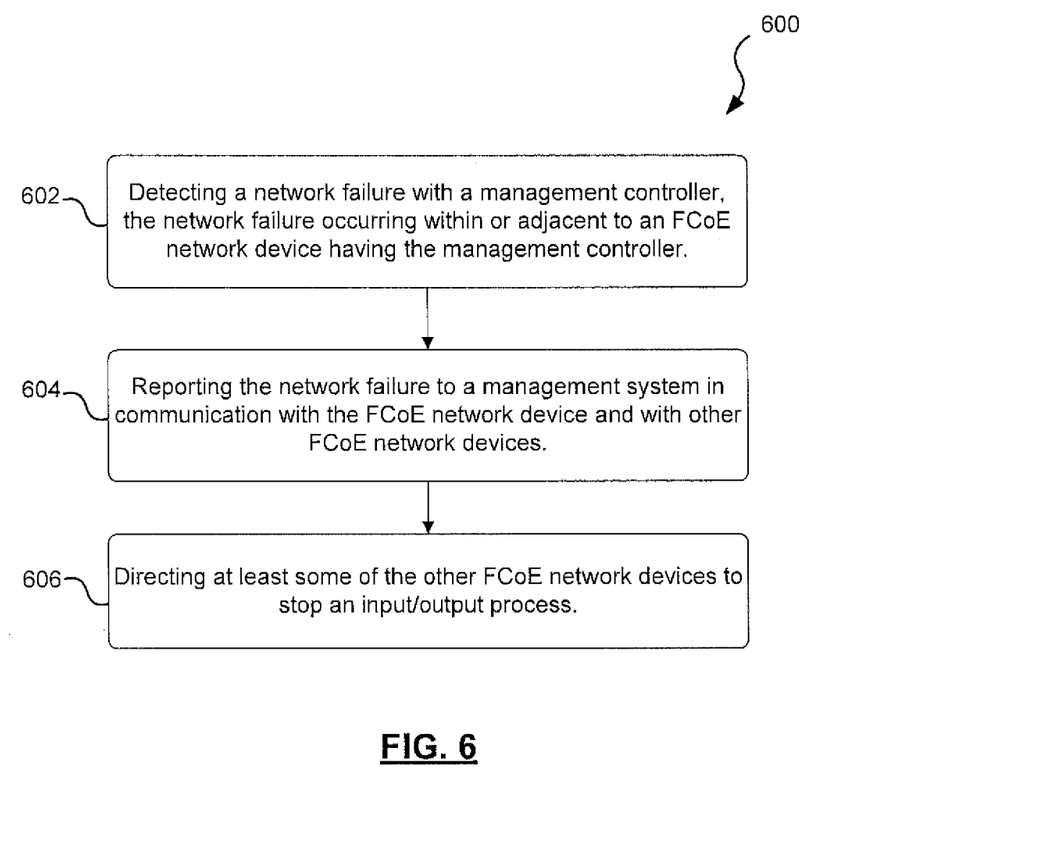
FIG. 6 is a flowchart of a method of failure mitigation in an FCoE network according to an embodiment.

FIG. 6 is a flowchart of a method 600 of failure mitigation in a network. Such a network may be an FCoE network like that included in information handling systems 100, 300, and 400. As illustrated, the method 600 includes several enumerated steps. However, embodiments of the method 600 may include additional steps before, after, and in between the enumerated steps, or as part of one of the enumerated steps. The method 600 may begin in step 602 in which a management controller detects a network failure. The network failure occurs within or adjacent to a network device that implements the Fibre Channel over Ethernet (FCoE) protocol and includes the management controller. In step 604, the network device reports the network failure to a management system that is in communication with the management network and with other FCoE-enabled network devices. And in step 606, at least some of the other FCoE network devices are directed to stop an input/output process. The other FCoE network devices may be directed by the network device or by the management network or a controller thereof.

The method 600 of FIG. 6 may be better understood by reference to information handling systems 100, 300, and/or 400. An example is provided herein with respect to information handling system 300 of FIG. 3 to better explain an embodiment of method 600. The management controller on the FC forwarder 306 receives an interrupt from the CPU of the FC forwarder 306 on which a host operating system has crashed. The interrupt communicates the node failure to the management controller (step 602). The management controller on the FC forwarder 306, which has its own power supply, can communicate even when the host CPU or operating system fails. The management controller of the FC forwarder 306 reports the node failure to the management network 200. This may include transmitting a message or advertisement to a management network controller or orchestrator or more directly to other management controllers that are part of the management network 200 (step 602). The information sent in the message by the management controller of the FC forwarder 306 is provided to the other devices in the information handling system 300, such as the FSB switch 304 and the server 302. For example, the server 302 may recognize that the FC forwarder 306 is in its transmission path to the FC switch 308 and the coupled storage resources accessed thereby. This may be done by querying the topology-aware database on the management controller. To avoid the loss of data, the server 302 stops pending inputs and outputs. Thus, the management controller on the FC forwarder 306 directs the server 302 to stop an input/output process (step 606). Other aspects discussed above in connection with information handling systems 100, 300, and 400 and their associated management systems are applicable to method 600.

Figure 7:
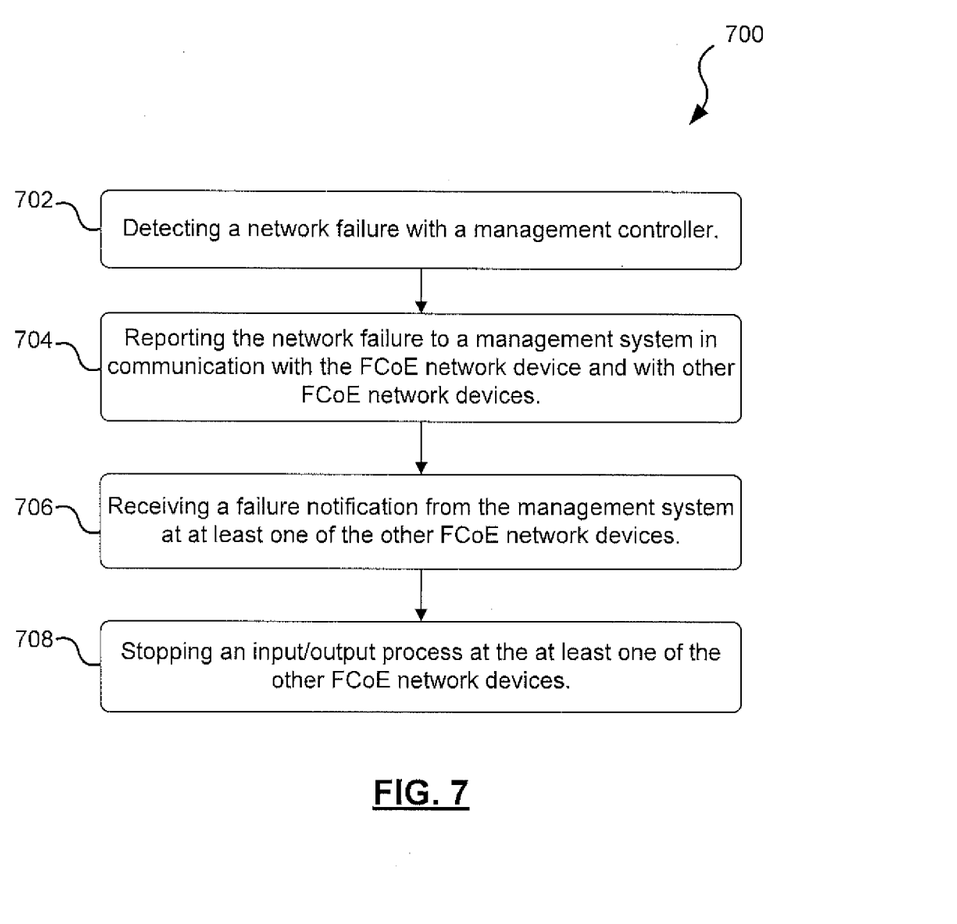
FIG. 7 is a flowchart of an additional method of failure mitigation in an FCoE network according to an embodiment.

FIG. 7 is a flowchart of a method 700 of mitigating a failure in a network, such as an FCoE implementing network as in information handling systems 100, 300, and 400 as described above. Like the method 600 of FIG. 6, FIG. 7 includes the method 700 with several enumerated steps. However, embodiments of the method 700 may include additional steps before, after, and in between the enumerated steps, or as part of one of the enumerated steps. The method 700 may begin in step 702 in which a management controller detects a network failure. The management controller is present on a network device that is next to or contains the network failure. In step 704, the network failure is reported to a management system that is in communication with the network device and with other network devices in an information handling system. At least one of the other network devices receives the reported failure notification from the management system, in step 706. In some embodiments, all of the other network devices may receive the reported failure notification. In step 708, the receiving network device stops an input/out process in response to the received failure notification report.

To better explain method 700, reference is made to information handling system 300. However, method 700 may be performed by information handling systems 100 and 400 including their respective management systems. Thus steps of the method 700 may be performed by the management controller on the FC forwarder 306 in response to the node failure 310. The management controller on the FC forwarder 306 may receive a signal from the host CPU thereof indicating a failure, such as a software failure, that prevents the FC forwarder 306 from receiving and forwarding packets as normal (step 702). The management controller on the FC forwarder 306 sends a message to the management system 200 reporting the node failure 310. In some embodiments, the message may be transmitted to all devices coupled by the management system (server 302, FSB switch 304, and FC switch 308 as illustrated in FIG. 3) or just to the neighbors or peers of the FC forwarder 306 (step 704). The management controller on another device, for example the FSB switch 304, receives the message with information that identifies the location of the failure and indicates the type of failure (step 706). Thus, the message may indicate to the FSB switch 304 that the failure is a node failure occurring on the FC forwarder 306. The management controller on the FSB switch 304 recognizes the failure and the location thereof to determine an appropriate response. Because the FC forwarder 306 is present in a transmission path of the FSB switch 304, the management controller of the FSB switch 304 may direct the host CPU thereof to stop pending inputs and outputs (step 708).

Some embodiments of information handling systems 100, 300, and 400 include tangible, non-transient, machine-readable media that include executable code or software instructions that when run by a processor, such the one or more processors of the network devices in FIGS. 1, 2, 3, and 4 may cause the processor(s) to perform the steps of methods 600 and/or 700 as described above. These processors may include the central processor 502, the network processor 504, and the management controller 506 as included in the network device 500 of FIG. 5. The executable code may be executed by processors on multiple devices to performs some embodiments of methods 600 and 700.

Some common forms of machine-readable media that may include the steps of methods 600 and 700 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 510 of FIG. 5 or other memory within one or more network devices.

Embodiments of this disclosure may provide for more effect failure mitigation in FCoE networks. Rather than relying the keepalive mechanism, out-of-band management controllers are used to monitor network device performance, collect and organization such data, and communicate failures and topographically identifying information to other management controllers forming a management network. The embodiments may provide for traffic management within less than a second of the occurrence of a failure. Additionally, while the embodiments described herein are described with respect to FCoE networks, the information handling systems, devices and methods are not limited to FCoE networks, but may be advantageous is mitigating traffic failures in other types of network environments according to the principles described above.

Thus, the examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
    a plurality of ports for sending and receiving Fibre Channel over Ethernet (FCoE) frames over a first network of network devices; and
    a management controller configured to:
        maintain a topology-aware database that provides a topology of the first network;
        receive a first message over a second network indicating a failure in the first network, wherein the second network couples management controllers of the network devices;
        determine a location of a failed link in the first network based on information included in the first message;
        query the topology-aware database based on the location of the failed link to determine whether the failed link is in a spanning tree protocol path of the first network; and when the failed link is in the spanning tree protocol path of the first network, transmit a second message to an FCoE peer device to cause the FCoE peer device to stop routing traffic to the failed link.

2. The information handling system of claim 1, wherein the failure is caused by a central processor failure, a network processor failure, or a failure detected at one of the plurality of ports.

3. The information handling system of claim 1, wherein the second network is an out-of-band network from the first network.

4. The information handling system of claim 1, wherein the management controller includes a memory, the memory containing the topology of the first network.

5. The information handling system of claim 1, wherein the management controller is further configured to communicate information regarding a second failure using the second network.

6. The information handling system of claim 5, wherein the second failure is reported before a link monitoring timer expires.

7. The information handling system of claim 5, wherein the management controller is further configured to report the second failure by temporarily stopping inputs and outputs on a coupled network device.

8. The information handling system of claim 5, wherein the second failure is reported to a network device that neighbors the information handling system.

9. The information handling system of claim 5, wherein the management controller reports the second failure to a plurality of coupled network devices.

10. A method of failure mitigation in a Fibre Channel over Ethernet (FCoE) network, the method comprising:
   maintaining, by an FCoE device in the FCoE network, a topology-aware database that provides a topology of a first network, the first network coupling a plurality of network devices;
   receiving, by the FCoE device, a first message over a second network, the second network coupling a plurality of management controllers of the plurality of network devices, the first message indicating a network failure in the first network;
   determining, by the FCoE device, a location of the network failure based on information included in the first message;
   querying, by the FCoE device, the topology-aware database based on the location of the network failure to determine whether the network failure is in a spanning tree protocol path of the first network; and
   when the network failure is in the spanning tree protocol path of the first network, directing, by the FCoE device, one or more FCoE peer devices to stop routing traffic to the network failure.

11. The method of claim 10, wherein directing the one or more FCoE peer devices to stop an input/output process comprises reporting the network failure to the one or more FCoE peer devices.

12. The method of claim 10, further comprising exchanging device information among the FCoE device and the one or more FCoE peer devices.

13. The method of claim 12, wherein the device information includes a device identifier, a device type identifier, and/or state information.

14. The method of claim 10, wherein the network failure is a device processor failure, a link failure, or a device operating system failure.

15. The method of claim 11, wherein reporting the network failure comprises communicating a network device identifier and a type of the network failure.

16. The method of claim 11, wherein reporting the network failure further comprises communicating a list of media access control (MAC) addresses of a plurality of second network devices coupled to the FCoE device.

17. A non-transitory computer-readable medium including instructions that when executed by one or more processors of an information handling system, causes the information handling system to perform a method of mitigating a failure in a Fibre Channel over Ethernet (FCoE) network, the method comprising:
   maintaining a topology-aware database that provides a topology of a first network, the first network coupling a plurality of FCoE network devices;
   receiving a failure notification from a management system of at least one of the FCoE network devices;
   determining a location of a link failure based on information included in the failure notification;
   querying the topology-aware database based on the location of the link failure to determine whether the link failure is in a spanning tree protocol path of the information handling system; and
   when the link failure is in the spanning tree protocol path of the information handling system, transmitting instructions to a neighboring device of the FCoE network devices to cause the neighboring device to stop routing traffic to the link failure.

18. The non-transitory computer-readable medium of claim 17, wherein the one or more processors includes a central processor and a management controller.

19. The non-transitory computer-readable medium of claim 17, wherein the management system is an out-of-band management system.

20. The non-transitory computer-readable medium of claim 17, wherein the method further comprises reporting the link failure over a direct link to the neighboring device.

* * * * *